(12) United States Patent
Cox et al.

(10) Patent No.: US 9,696,492 B1
(45) Date of Patent: Jul. 4, 2017

(54) ON-CHIP PHOTONIC-PHONONIC EMITTER-RECEIVER APPARATUS

(71) Applicants: National Technology & Engineering Solutions of Sandia, LLC, Albuquerque, NM (US); Peter Thomas Rakich, New Haven, CT (US); Heedeuk Shin, New Haven, CT (US); Zheng Wang, Austin, TX (US)

(72) Inventors: Jonathan Albert Cox, Albuquerque, NM (US); Robert L. Jarecki, Jr., Albuquerque, NM (US); Peter Thomas Rakich, New Haven, CT (US); Zheng Wang, Austin, TX (US); Heedeuk Shin, New Haven, CT (US); Aleem Siddiqui, Albuquerque, NM (US); Andrew Lea Starbuck, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/060,388

(22) Filed: Mar. 3, 2016

(51) Int. Cl.
*G02F 1/295* (2006.01)
*G02B 6/12* (2006.01)
*G02B 6/122* (2006.01)
*G02F 1/125* (2006.01)
*G02B 1/00* (2006.01)

(52) U.S. Cl.
CPC .......... *G02B 6/1225* (2013.01); *G02B 1/005* (2013.01); *G02F 1/125* (2013.01); *G02B 2006/12061* (2013.01)

(58) Field of Classification Search
CPC ........ G02B 6/1225; G02B 1/005; G02F 1/125
USPC .................................................. 385/1, 5, 14
See application file for complete search history.

(56) References Cited

U.S. PATENT DOCUMENTS

| | | | |
|---|---|---|---|
| 7,421,179 B1 * | 9/2008 | Jiang | B82Y 20/00 385/129 |
| 8,600,200 B1 | 12/2013 | Rakich et al. | |
| 9,268,092 B1 | 2/2016 | Jarecki et al. | |
| 2005/0259937 A1 * | 11/2005 | Whaley | G02B 6/122 385/132 |
| 2010/0226608 A1 * | 9/2010 | Chen | B82Y 20/00 385/28 |

OTHER PUBLICATIONS

"Analyses of mode coupling in joined parallel phononic crystal waveguides" by Sun et al, Physical Review B, vol. 71, paper 174303, 2005.*

"Confined longitudinal acoustic phonon modes in free-standing Si membranes coherently excited by femtosecond laser pulses" by Hudert et al, Physical Review B, vol. 79, paper 201307, 2009.*

(Continued)

*Primary Examiner* — Robert Tavlykaev
(74) *Attorney, Agent, or Firm* — Martin I. Finston

(57) ABSTRACT

A radio-frequency photonic devices employs photon-phonon coupling for information transfer. The device includes a membrane in which a two-dimensionally periodic phononic crystal (PnC) structure is patterned. The device also includes at least a first optical waveguide embedded in the membrane. At least a first line-defect region interrupts the PnC structure. The first optical waveguide is embedded within the line-defect region.

23 Claims, 10 Drawing Sheets

(56) References Cited

OTHER PUBLICATIONS

"Photon confinement in photonic crystal nanocavities" by Lalanne et al, Laser & Photonics Review, vol. 2, No. 6, pp. 514-526, 2008.*
"General recipe for designing photonic crystal cavities" by Englund et al, Optics Express, vol. 13, No. 6, pp. 5961-5975, 2005.*
"Microwave synthesizer using an on-chip Brillouin oscillator" by Li et al, Nature Communications, vol. 4:2097, pp. 1-7, Jun. 2013.*
Shin, H. et al., "Tailorable Stimulated Brillouin Scattering in Nanoscale Silicon Waveguides", Nature Communications, 2013, article DOI 10.1038/nmcomms2943.
Shin, H. et al., "Control of Coherent Information Via On-Chip Photonic-Phononic Emitter-Receivers", Nature Communications, 2015, article DOI: 10.1038/nmcomms7427.
Rakich, P. T. et al., "Giant Enhancement of Stimulated Brillouin Scattering in the Subwavelength Limit" 2012, article 011008.

* cited by examiner

ON-CHIP PHOTONIC-PHONONIC EMITTER-RECEIVER APPARATUS

STATEMENT OF GOVERNMENT INTEREST

This invention was made with Government support under Contract No. DE-AC04-94AL85000 awarded by the U.S. Department of Energy. The Government has certain rights in the invention.

FIELD OF THE INVENTION

The invention relates to radio-frequency photonic devices, and more particularly to devices that employ photon-phonon coupling for information transfer.

ART BACKGROUND

Interactions between photons and phonons in engineerable micro-scale and nano-scale structures and materials have attracted interest for the purpose of chip-scale radiofrequency (RF) photonic signal processing.

For example, U.S. Pat. No. 8,600,200 by P. T. Rakich et al., assigned at least in part to an assignee hereof, issued on Dec. 3, 2013 under the title "Nano-Optomechanical Transducer," describes a nano-optomechanical transducer in which transmitting and receiving optical waveguides are mechanically coupled to a suspended membrane. An input optical signal generates an acoustic wave that propagates in the suspended membrane and modulates an optical signal propagating in the receiving waveguide. The entirety of the abovesaid U.S. Pat. No. 8,600,200 is hereby incorporated herein by reference.

In a further example, U.S. Pat. No. 9,268,092 by R. L. Jarecki, Jr. et al., which issued on Feb. 23, 2016 under the title, "Guided Wave Opto-Acoustic Device," and which is assigned at least in part to an assignee hereof, describes a suspended membrane device in which at least one optical waveguiding member is included in the membrane. At least one phononic resonator is defined in the membrane and traversed by the optical waveguiding member. Guided-wave, stimulated Brillouin scattering (SBS) in the device can be applied in various signal-processing applications. The entirety of the abovesaid U.S. Pat. No. 9,268,092 is hereby incorporated herein by reference.

Similarly, H. Shin et al., "Tailorable stimulated Brillouin scattering in nanoscale silicon waveguides," *Nature Communications* (Jun. 6, 2013) DOI: 10.1038/ncomms2943, reported on hybrid photonic-phononic waveguides that confine both photons and phonons using a Brillouin-active membrane structure, and that exhibit forward SBS gain. The entirety of the abovesaid paper by Shin et al., which is hereinafter referred to as "Shin 2013", is hereby incorporated herein by reference.

Further, various investigators have achieved engineerable coupling between resonant photonic and phononic modes in chip-scale systems. Although resonant systems can achieve strong coupling and high frequency selectivity, they also suffer from disadvantages such as sensitivity to the optical wavelength.

However, the achievement of narrow-band RF filters that simultaneously achieve high optical power handling, low signal distortion, and optical wavelength insensitivity has been elusive. Hence there has been a need for new approaches that utilize the potentialities of photon-phonon coupling for RF signal processing with greater versatility.

SUMMARY OF THE INVENTION

We have developed a chip-scale photonic-phononic emitter-receiver (PPER) system that produces strong photon-phonon coupling without requiring optical resonance. Our system has a travelling-wave geometry in which independent control of guided photonic and phononic modes is possible.

In operation of an example embodiment, optical signals propagating in an emitter optical waveguide produce forces that transduce coherent phononic signals in the waveguide core. A phononic crystal (PnC) superstructure that surrounds the emitter optical waveguide and also surrounds a nearby receiver optical waveguide shapes the transfer of the phononic signal to the receiver optical waveguide. In turn, the receiver optical waveguide converts the signal from the acoustic domain back to the optical domain through photoelastic coupling.

The transfer function that governs the phononic coupling between the emitter and receiver waveguides can be tailored by suitable engineering of the PnC superstructure. This enables the designer to control properties of the transduction process such as bandwidth, frequency, and conversion efficiency, even at RF frequencies in the gigahertz range.

The phononic signal consists of acoustic waves of frequencies that lie within the band gap of the PnC and that are consequently confined, to some extent, to phononic crystal line defects in the vicinities of the optical waveguides. The transfer function therefore depends not only on the design of the PnC structure per se, but also on the modal structures of the line defects.

In another example embodiment, the transduction of coherent phononic signals and the reconversion from the acoustic domain back to the optical domain take place within the same optical waveguide, rather than in separate emitter and receiver waveguides. The transfer function that governs the phononic coupling between the input and output optical signals (within the same waveguide) can be tailored by suitable engineering of the PnC superstructure responsible for phononic confinement, and especially by suitable engineering of the PnC line defect.

Accordingly, the invention in an embodiment includes a membrane in which a two-dimensionally periodic phononic crystal (PnC) structure is patterned. At least a first optical waveguide is embedded in the membrane. At least a first line-defect region interrupts the PnC structure. The first optical waveguide is embedded within the line-defect region.

In embodiments, at least a first and a second optical waveguide are embedded in the membrane within line-defect regions that interrupt the PnC structure. The first and second optical waveguides are parallel to each other but have no substantial optical coupling to each other. A central region of the PnC structure lies between the first and second optical waveguides. In embodiments, there is at least 100 dBm of isolation between the first and second optical waveguides.

In embodiments, an input end of the first optical waveguide is optically coupled to a path for an optical input carrier wave and an optical local oscillator wave, an input end of the second optical waveguide is optically coupled to a path for an optical probe wave, and an output end of the second optical waveguide is optically coupled to a path for an output signal.

In embodiments, the first optical waveguide is configured as a Fabry-Perot resonator cavity for the optical input carrier wave and the optical local oscillator wave.

In embodiments, one or more further line-defect regions interrupt the PnC structure between the first optical waveguide and the second optical waveguide.

Some embodiments are configured as frequency filters for radio-frequency (RF) signals modulated onto the optical input carrier wave from a signal source.

Some embodiments are configured as wavelength converters for transferring radio-frequency (RF) signals from an optical input carrier wave of a first carrier wavelength propagating in the first optical waveguide to an optical carrier wave of a second carrier wavelength propagating in the second optical waveguide.

Some embodiments are configured as amplifiers for transferring radio-frequency (RF) signals from an optical input carrier wave of a first intensity propagating in the first optical waveguide to an optical carrier wave of a second intensity propagating in the second optical waveguide.

In some embodiments, an optical input carrier wave and an optical local oscillator wave are coupled into the first waveguide, and a radio-frequency (RF) modulator is arranged to modulate an RF signal onto the optical input carrier wave.

DETAILED DESCRIPTION

Certain aspects of the PPER system described here are discussed in the publication, H. Shin et al., "Control of coherent information via on-chip photonic-phononic emitter-receivers," *Nature Communications* (Mar. 5, 2015) DOI: 10.1038, ncomms7427, the entirety of which is hereby incorporated herein by reference.

Figure 1:
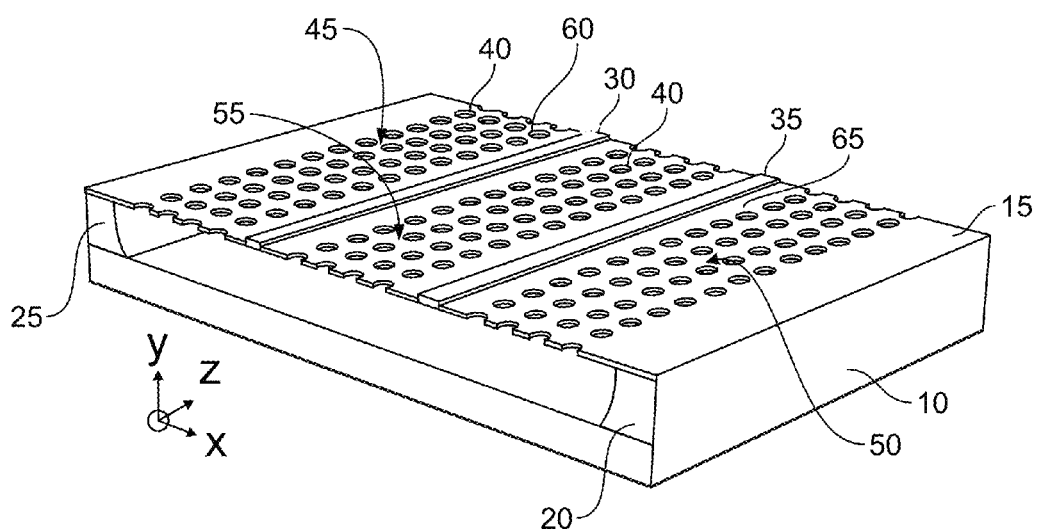
FIG. 1 is a schematic diagram of a PPER system consisting of two silicon optical waveguides embedded in a phononic crystal membrane.

FIG. 1 provides a perspective, schematic view of our new PPER system in an example embodiment. The drawing shows a substrate 10 and a silicon nitride membrane 15 suspended between supporting projections 20, 25. Two silicon optical waveguides are embedded in the membrane. They are emitter optical waveguide 30 and receiver optical waveguide 35. The PnC structure is defined by a two-dimensional array of round holes 40 that perforate the membrane. The PnC structure includes symmetric PnC regions 45 and 50 that are placed outside the outer boundaries of the optical waveguides, and central PnC region 55 that is placed between the optical waveguides. Each of the optical waveguides is centered within a respective line defect region 60, 65. The line defect regions are elongated portions of the membrane that are "defects" in the PnC structure because they lack holes.

It should be understood that the material system presented here, which includes silicon waveguides and a silicon nitride membrane, is a non-limiting example. As those skilled in the art will appreciate, there are a variety of other suitable waveguide materials, including silicon nitride, germanium, chalcogenide glass, silicon dioxide, $As_2S_3$ glass, and gallium arsenide and other III-V compounds. Likewise, other suitable membrane materials include silicon dioxide, silicon carbide, and alumina.

The periodicity of the PnC structure gives rise to a band structure, including a band gap. Phonons having frequencies that fall within the band gap cannot propagate. Because each line defect is bounded on each side by a portion of the PnC structure, it is possible, in operation, for phonons having band-gap frequencies to be confined within the PnC line defects. Concurrently, the silicon waveguides within each PnC line defect are capable of guiding light by total internal reflection.

Importantly, the central PnC region 55 does not have perfect reflectivity. Because the reflectivity of that region is finite, there is evanescent coupling between the phononic defect modes of the emitter port and the phononic defect modes of the receiver port. This coupling can be controlled through suitable design of the PnC.

Because of the phononic coupling between the emitter and receiver ports, the modes associated with the respective line defects hybridize to create joint patterns of excitation that we refer to as "supermodes". The supermodes have frequency spectra that are distinct from the modal spectra of the individual, isolated line defects.

The supermodes give rise to a multi-pole phononic transfer function for the coupled system. The multi-pole transfer functions that we have studied exhibit frequency selectivities that are far superior to singly resonant systems such as those described in Shin 2013. This is significant not least because of the advantages of such multi-pole transfer functions for high-performance signal processing applications.

As those skilled in the art will appreciate, the exemplary dual-port PPER device topology of FIG. 1 is easily generalized; indeed, higher-order (e.g., third, fourth, and fifth order) responses can be produced by increasing the number of coupled line-defects. Thus, our new PPER device concept opens up a compelling new design space for hybrid photonic-phononic signal processing.

It should also be borne in mind that although we provide an example, below, in which the PPER device is implemented in a particular material system, such implementation is not limiting. Instead, there are a variety of material systems known in the art in which this device concept can be implemented.

Figure 2:
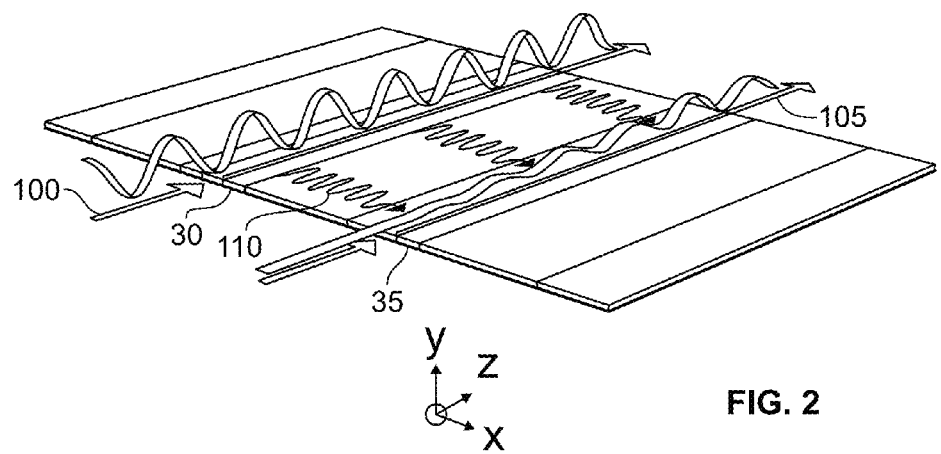
FIG. 2 is diagram illustrating the principle of PPER operation. The optical input signal, optical output signal and transduced phonon waves are represented in the figure.

FIG. 2 illustrates the operation of the example PPER device. Optical input signal 100 is shown propagating in emitter waveguide 30, optical output signal 105 is shown propagating in receiver waveguide 35 and as growing in amplitude as it traverses the receiver waveguide. Transduced phonon waves 110 are shown propagating (left to right in the figure view) from the emitter waveguide to the receiver waveguide. The output optical signal is created by the parametric coupling of the phonons to a monochromatic light beam, of disparate wavelength from the optical input signal, that is injected into the receiver waveguide.

Figure 3:
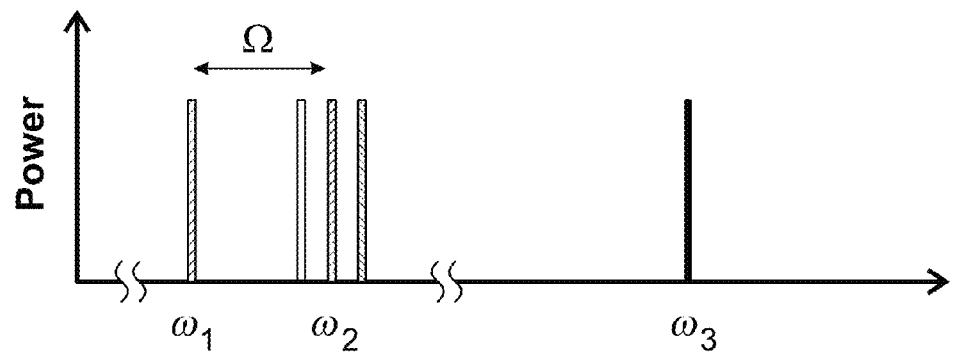
FIGS. 3-5 are representative spectra of the input (3) and output (5) optical signals and the response (4) produced by phononic supermodes that mediate information transfer. The transfer function of the phononic supermodes is indicated by shading in FIG. 5.

FIG. 3 is an example spectrum of optical input signals. The line at frequency $\omega_1$ is the local oscillator, which is injected into the emitter waveguide. The line at frequency $\omega_2$ is the pump field, which is also injected into the transmitter waveguide and carries the RF signal as an amplitude modulation on this beam. The local oscillator field can be tuned to an adjustable frequency offset 11 from the local oscillator; i.e., $\omega_2=\omega_1+\Omega$. The beat frequency between the modulated pump beam and the local oscillator produce acoustic waves encoded with the RF signal and centered at a frequency that is tuned by changing the frequency of the local oscillator.

As shown in FIG. 3, the central peak at the pump frequency $\omega_2$ is flanked by two side-bands. These side-bands represent the effect of modulating data, having a finite bandwidth, onto the pump field.

The line at frequency $\omega_3$ is the probe field, which is injected into the receiver waveguide. The probe field is the monochromatic light beam onto which data is transferred to produce the output signal.

Figure 4:
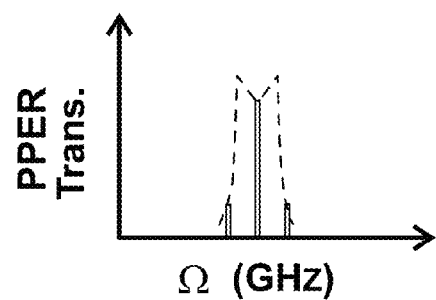

FIG. 4 is an example phononic transfer function for the coupled system. As there are only two coupled line defects, this is a two-pole (or "second order") transfer function.

Figure 5:
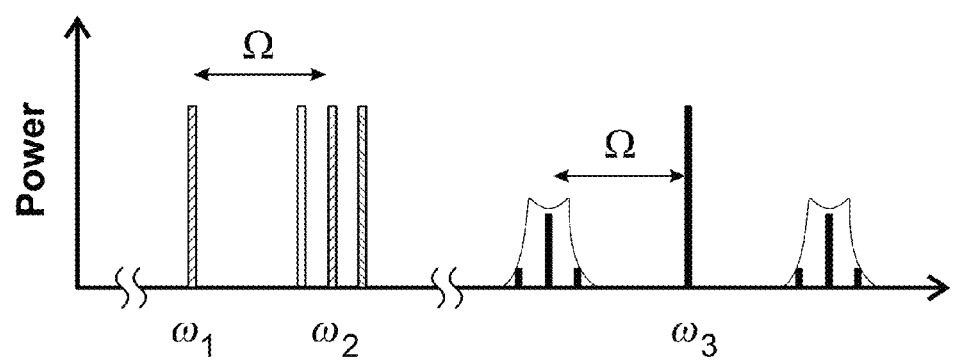

FIG. 5 is an example spectrum of an optical output signal. Optical forces generated in the emitter waveguide drive the excitation of phonons of frequency $\Omega$. Information is transmitted from the emitter port to the receiver port by the phonon supermodes, subject to the transfer function of FIG. 4. The parametric coupling that takes place in the receiver port causes information to be encoded on the probe beam to form the output signal.

As seen in FIG. 5, the central peak at frequency $\omega_3$ is flanked by two side-bands separated from the central peak by a frequency difference equal to $\Omega$. Each side-band falls within an envelope corresponding to the phononic transfer function of FIG. 4. Data is transferrable to these side-bands, but it is rejected outside the passband(s) of the filter.

As those skilled in the art will appreciate, a single carrier, together with its sidebands that are created by modulation, is sufficient to create phonons. However, the use of a local oscillator in addition to a modulated pump wave is advantageous because it allows for tuning of the center frequency of the generated phonons by varying the local oscillator frequency.

Strong coupling between the co-located optical and phononic modes is mediated by optical forces generated within the silicon waveguide cores. This form of travelling-wave photon-phonon coupling is termed forward SBS or stimulated Raman-like scattering. Through forward SBS, energy can be transferred between optical pump and signal waves propagating within the waveguide.

As with other scattering phenomena, forward SBS must satisfy conditions of energy and momentum conservation. Given a scattering event between a lightwave of wavevector $k_1$ and frequency $\omega_1$ and a lightwave of wavevector $k_2$ and frequency $\omega_2$ that is mediated by a phonon of wavevector K and frequency $\Omega$, momentum conservation requires that $K=k_1-k_2$. Phonons are generated at the optical difference frequency; hence $\Omega=\omega_1-\omega_2$.

Figure 6:
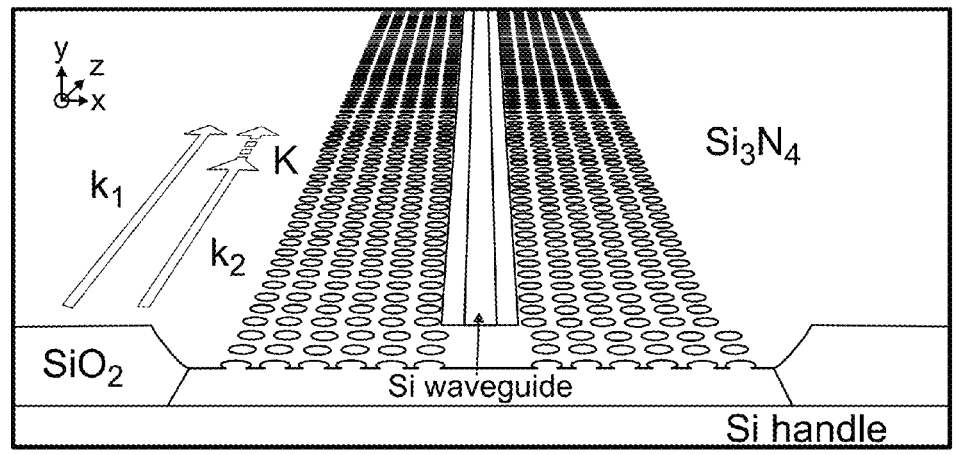
FIG. 6 is a schematic diagram illustrating the anatomy of a PnC-BAM waveguide, with indication of the wavevectors of the optical pump ($k_1$), the scattered light ($k_2$) and the phonon (K).

FIG. 6 includes a vector momentum diagram for forward SBS. Here, a phonon of wavevector $K=k_1-k_2$ and frequency $\Omega=\omega_1-\omega_2$ mediates the interaction, where $k_j$ and $\omega_j$, i=1,2, are the wavevector and frequency of interacting optical waves.

The functional dependence of the wavevector on the frequency of a wave (or vice versa) is referred to as a dispersion relation. The shapes of the respective dispersion relations for $\Omega(K)$, $\omega_1(k_1)$, and $\omega_2(k_2)$ determine the wavevector and frequency values for which the conditions $K=k_1-k_2$ and $\Omega=\omega_1-\omega_2$ are simultaneously satisfied. It is important to note in this regard that $k_1$ and $k_2$ are both substantially directed in the z-direction, i.e. the optical propagation direction along the optical waveguide axis. By contrast, K is predominantly directed in the x-direction, i.e. perpendicular to the optical axis but within the plane of the membrane. It is evident that to conserve momentum, K must also have a (relatively small) component $K_z$ in the z-direction. Because $K_z$ is freely variable (within certain limits), momentum can still be conserved while continuously varying the optical frequency difference $\omega_1-\omega_2$.

The requirement for momentum conservation (often referred to in this context as a requirement for phase matching) also implies that the group velocity of the optical signals must match the phase velocity of the guided phonon mode, i.e., $(\Omega/|K|)$. Because the optical group velocities are typically a substantial fraction of the vacuum velocity of light, this condition is generally satisfied only by guided phonon modes with ultra-slow group velocities $\partial\Omega/\partial|K|$, e.g. those on the order of 1 m s$^{-1}$.

By way of example, we performed an experimental and computational modeling study of a single, Brillouin-active silicon optical waveguide embedded in a PnC to achieve an understanding of the pertinent physical phenomena.

A highly tensile silicon nitride membrane was patterned to form two PnC regions, each consisting of a square lattice of holes, that were placed symmetrically about the silicon waveguide core. Bragg reflection produced by these PnC regions created phonon modes (that is, defect modes) that were confined because they were within the phononic stopband. The silicon waveguide core tightly confined the guided optical mode through total internal reflection. We refer to the resulting composite structure as a phononic crystal, Brillouin-active membrane (PnC-BAM) waveguide.

We used full-vectorial multi-physics simulations to model a structure with a silicon nitride membrane thickness of 130 nm, a waveguide cross-section of 950×220 nm$^2$, a PnC lattice constant $a_o$ of 1 μm, and a hole radius $r_o$ of 0.385 μm. The model dimensions were chosen to match the actual waveguide width and film thicknesses observed in fabricated prototypes via cross-sectional SEM.

Figure 7:
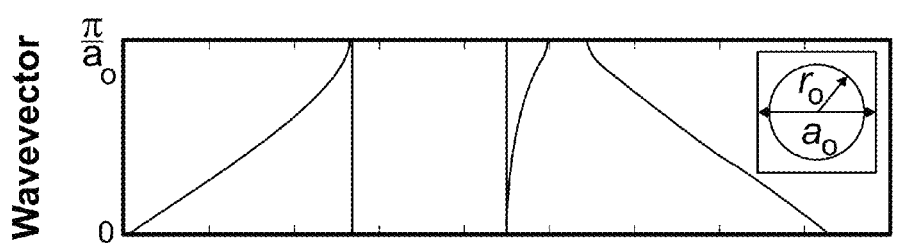
FIG. 7 is a dispersion diagram of a 2D phononic crystal (PnC), showing the phonon frequency versus the phonon wave vector in the x-direction. An inset depicts the unit cell of the 2D PnC.

For the dimensions that were modeled, we found that a PnC defect mode (illustrated in FIG. 7) was efficiently excited at a frequency of 3.72 GHz within the stopband of the phonon dispersion diagram provided in FIG. 7.

In silicon waveguides of the kind studied here, photon-phonon coupling is predominantly mediated by electrostrictive forces, since the contribution to SBS nonlinearities produced by radiation pressure decreases rapidly with increasing waveguide size. The optical force distribution of the fundamental TE-like mode produces strong coupling to symmetric zero-order Lamb waves. Hence, the excited PnC defect mode is understood to be a symmetric Lamb-wave, it has a small flexural character because of the vertical asymmetry of the protruding silicon waveguide core, as shown, e.g., in FIG. 8.

FIG. 7, referred to above, shows the computed phononic dispersion curves associated with the symmetric Lamb waves within the fabricated 2D PnC structure. It should be noted that defect-mode confinement does not necessitate a complete phononic bandgap, as the wavevector of the emitted phonons is nearly perpendicular (100 microradians from normal) to the direction of light propagation.

Moreover, the phase matching conditions of forward-SBS permit strong optical coupling only to phonons with wavevectors in the Γ-X direction. Hence, only the dispersion in the Γ-X direction, which has been illustrated in FIG. 7, is relevant to the creation of Brillouin-active defect modes. As indicated in the figure, the fundamental phononic stopband associated with the Brillouin-active symmetric Lamb waves extends from 2.6 to 4.5 GHz.

By designing the width $W_o$ of the phononic defect, individual Brillouin-active PnC defect modes can be created at select frequencies within this stopband, yielding strong Brillouin resonances and strong photon-phonon coupling.

The photon-phonon coupling was quantified through experimental studies of a fabricated PnC-BAM waveguide suspended continuously over a 4-mm length. By providing lithographically tapered silicon input and output couplers, we made sure that only the fundamental TE-like mode would be excited. The strength of photon-phonon coupling was experimentally determined through heterodyne four-wave mixing experiments, which made it possible to study Brillouin-active phonon modes between 0.5 and 9 GHz.

Figure 9:
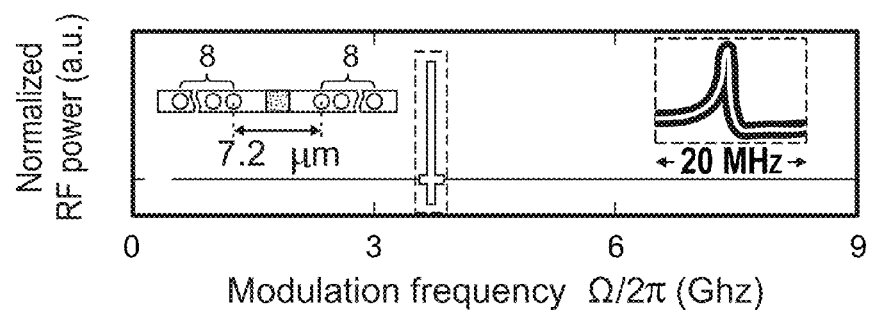
FIG. 9 provides a spectrum of Brillouin responses of a representative PPER device obtained through heterodyne four-wave mixing measurements. The left-hand inset shows the schematic geometry of the PnC-BAM waveguide.

FIG. 9 provides a spectrum of Brillouin responses obtained through heterodyne four-wave mixing measurements. The output signal from the PnC-BAM waveguide for $W_o=7.2$ μm is shown normalized to that of a reference silicon waveguide (Brillouin inactive) under identical experimental conditions. The left-hand inset in the figure depicts, schematically, the geometry of the PnC-BAM waveguide. The right-hand inset shows the result of a representative four-wave mixing measurement. It will be seen there that coherent interference between the Kerr and Brillouin nonlinear susceptibilities produced a characteristic Fano-like lineshape. The analysis of this line-shape provides a measurement of Brillouin nonlinearity relative to the intrinsic Kerr nonlinearity. In this instance, the analysis yielded a Brillouin gain coefficient $G_{SBS}$ (which equals twice the absolute value of the Brillouin nonlinear coefficient $\gamma_{SBS}$) of 1,960±355 W$^{-1}$ m$^{-1}$ and a linewidth of 1.2 MHz (or Q-factor of about 3,160 at a center frequency of 3.72 GHz).

Figure 10:
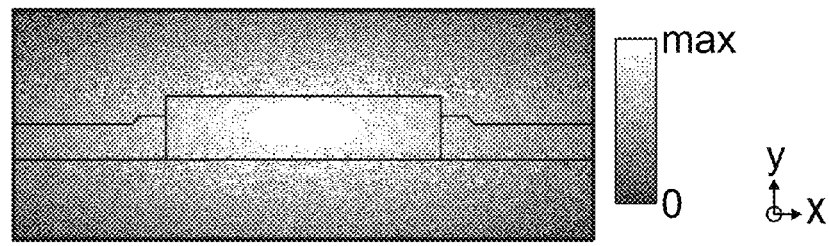
FIG. 10 shows the computed $E_x$ fields of an optical mode in a silicon waveguide.
Figure 11:
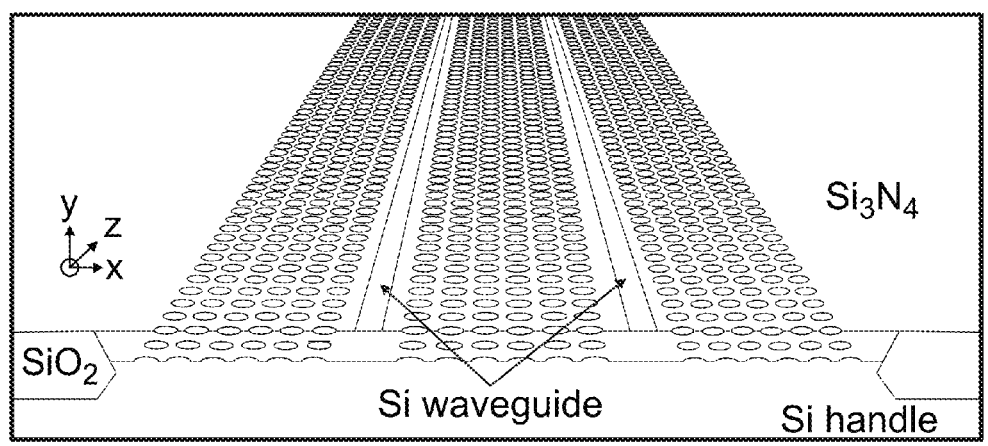
FIG. 11 is a schematic drawing that shows the dual-channel PnC-BAM waveguide that forms a PPER system described here.
Figure 12:
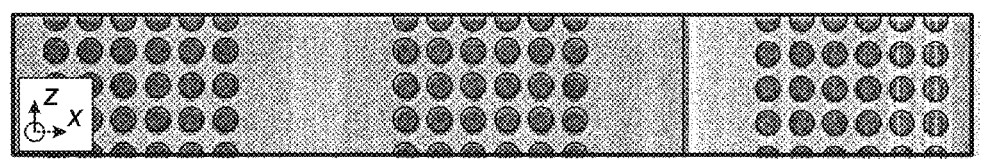
FIG. 12 is a view, based on an SEM image, of a portion of the dual-channel PPER system of FIG. 11.
Figure 16:
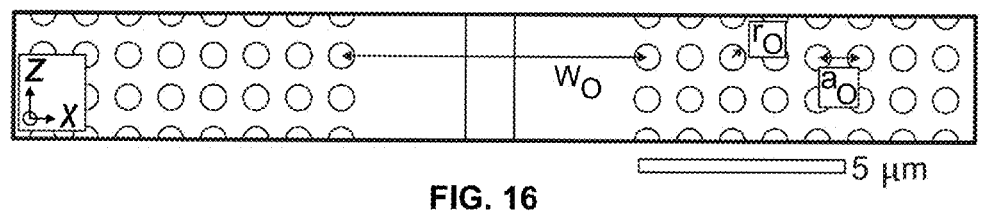
FIG. 16 is a top-down view, based on a scanning electron microscopy (SEM) image, of a portion of a PnC-BAM waveguide.

An example dual PnC-BAM waveguide of the kind shown in FIG. 1 has two silicon waveguides embedded within a silicon nitride PnC superstructure having two PnC line-defects of width $W_o=5.7$ μm as indicated in FIG. 16 (discussed below). The calculated $E_x$-field of the fundamental TE-like mode of each silicon waveguide is shown in FIG. 10. Each PnC line-defect is bounded by symmetrically placed PnC regions (N periods each). The centrally located PnC region of $N_c$ periods separates the line defects by a center-to-center distance of $[(N_c-1)\times a_o+W_o]$. FIGS. 11 and 12, for example, illustrate the special case of $N=N_c=6$. The respective silicon waveguides are centered within each line-defect so that the resulting dual channel system has mirror symmetry.

Theory.

As explained above, the transfer of phononic energy between the two waveguides, respectively designated here as Wg-A and Wg-B, is mediated by PnC supermodes consisting of evanescently coupled PnC defect modes within the superstructure. The transduced phononic information is then encoded on optical waves carried by Wg-B through photoelastic coupling.

In contrast to the phononic properties of the system, negligible optical cross-talk occurs between Wg-A and Wg-B, because the guided optical modes decay rapidly (on the order of 60 nm) outside of the silicon waveguide core. This guarantees that the signal transduction occurs only through the phononic domain, yielding low background noise level and high dynamic range. The coupling rate (p) between the phononic defect modes is mediated by the central PnC coupling region (of $N_c$ periods), whereas the external decay rate $\tau_e^{-1}$ from each defect mode is determined by the PnC cladding region (of N periods) on either side of the device.

The physics of phonon-mediated coupling between these waveguides can be treated analytically using temporal coupled-mode theory. Optical fields $E_1^a(\omega_1,t)$, $E_2^a(\omega_2,t)$, and $E_3^b(\omega_3,t)$ are injected into Wg-A, Wg-A, and Wg-B, respectively, and we seek the parametrically generated signal amplitude $E_s^b(\omega_s,t)$ at the output of Wg-B.

Figure 13:
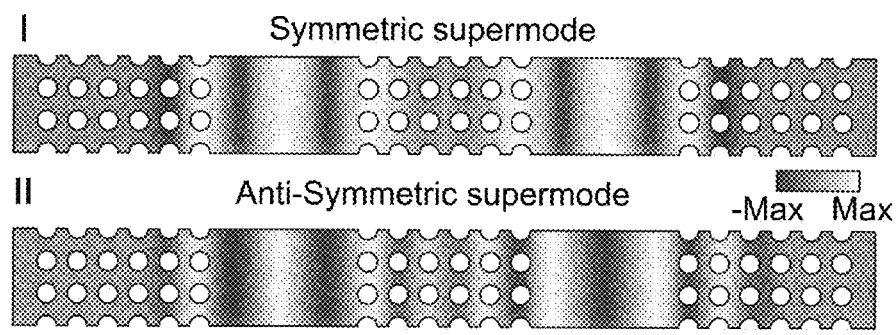
FIG. 13 is a schematic representation of the elastic displacement fields (for x-displacement) associated with symmetric and antisymmetric supermodes of a PPER system.

Optical forces produced by the interference between $E_1^a$ and $E_2^a$ drive the phonon supermodes; these can be expressed as a linear combination of the elastic displacement fields $e_a(x,y)$ and $e_b(x,y)$ of the phononic crystal defect modes in Wg-A and Wg-B respectively, as illustrated in FIG. 13.

Through use of temporal coupled mode theory, the modal hybridization and the resonant transduction between the Brillouin active modes can be accurately captured in terms of the modal coupling rate ($\mu$) and the net modal decay rate ($\tau_{net}^{-1}$). Using optical forces to source the excitation of the PnC defect mode in Wg-A, and using modal perturbation theory to determine the parametric growth of $E_s^b$ in Wg-B, one finds for the growth rate of the signal wave amplitude $B_s$ in the z-direction of propagation:

$$\frac{\partial B_s}{\partial z} = i\left[\frac{\omega_3 \tau_{net}}{2\Omega_0} \frac{\langle e_a, f_n^a \rangle \langle f_n^b, e_b \rangle}{\langle e_a, \rho e_a \rangle} \frac{2\mu/\tau_{net}}{\Gamma_-(\Omega)\Gamma_+(\Omega)}\right] A_1 A_2^* B_3 \quad (1)$$

$$= i[\gamma_{a\to b}(\Omega)] A_1 A_2^* B_3.$$

Here $\gamma_{a\to b}(\Omega)$ represents the phonon-mediated coherent coupling from Wg-A to Wg-B, and $\tau_{\pm}(\Omega) \equiv [\Omega-(\Omega\pm\mu)+i/\tau_{net}]$. We use the following definitions: $\Omega_0$ is the natural frequency of uncoupled phonon modes; $\rho(x,y)$ is the elastic medium mass density; $\tau_{net}^{-1}$, $\tau_e^{-1}$, and $\tau_o^{-1}$ are respectively the net, external, and internal phonon decay rates, where $\tau_{net}^{-1} = \tau_e^{-1}, \tau_o^{-1}$; $P_j^a$ and $P_j^b$ are the optical power respectively carried by $E_j^a$ and $E_j^a$; $A_j$ and $B_j$ are the normalized wave amplitudes of $E_j^a$ and $E_j^a$; and $f_n^a(x,y)$ and $f_n^b(x,y)$ are the power-normalized force densities produced by light in Wg-A and Wg-B under continuous-wave excitation. We have defined $A_j$ and $B_j$ such that $|A_j|^2 = P_j^a$ and $|B_j|^2 = P_j^b$. The natural frequency $\Omega_0$ is calculable using well-known techniques of nonlinear optics.

Figure 14:
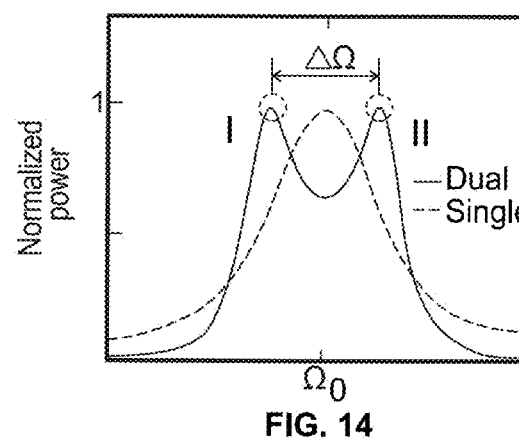
FIG. 14 is a representative plot of the parametric responses for single-channel (dashed curve) and dual-channel (solid curve) PnC-BAM waveguides.
Figure 15:
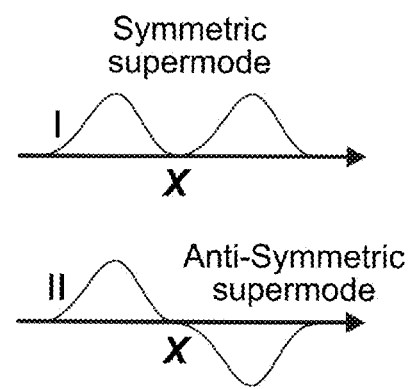
FIG. 15 provides a pair of representative curves illustrating the displacement distributions for symmetric (I) and anti-symmetric (II) supermodes.

As seen in FIG. 14, phonon-mediated coherent coupling from Wg-A to Wg-B (or $\gamma_{a\to b}(\Omega)$) exhibits a sharp second-order response with poles at $\Omega_\pm = \Omega_0 \pm \sqrt{\mu^2 - 1/\tau_{net}^2}$. These resonances correspond to symmetric and anti-symmetric phononic supermodes as illustrated in FIGS. 15 and 13. It should be noted that the second-order response produced by this doubly resonant system produces far sharper roll-off than the first order (Lorentzian) response of single-channel system as illustrated by the dashed curve in FIG. 2L.

Due to the symmetry of this geometry, the elastic displacement field ($e_j$), the power-normalized force density ($f_n^j$), and the overlap ($e_j, f_n^j$) are effectively identical in both waveguides (j=a, b). As a consequence, $|\gamma_{a\to b}(\Omega_\pm)| = G_o/2$, where $G_o$ is the single-waveguide Brillouin gain in the limit as $\tau_o^{-1} = 0$.

In the limiting case when $\mu = 0$ ($N_c = \infty$), it is evident that no information can be transduced from Wg-A to Wg-B, and the phononic eigenmodes of these waveguides are degenerate (in which case each corresponds to the dashed curve of FIG. 14). However, for finite couplings ($\mu > 0$), hybridization of the Brillouin-active phonon modes produces symmetric and anti-symmetric supermodes (see FIGS. 15 and 13) with resonances (i.e., poles) at frequencies $\Omega_+$ and $\Omega_-$, respectively. These hybridized phonon modes enable the information transfer between the two waveguides through phonon-mediated coherent information transduction.

In the low gain regime, the signal power $P_s^b$ is given by $P_s^b = |\gamma_{a\to b}(\Omega)|^2 P_1^a P_2^a P_3^b L^2$. It is evident from this expression that due to the factor $P_1^a P_2^a$, the signal increases quadratically with pump power, and that due to the factor $L^2$, it increases quadratically with the waveguide length that is traversed.

Fabrication.

The silicon cores of experimental prototype PnC-BAM waveguides were patterned on a silicon-on-insulator (SOI) wafer with a 3000-nm oxide undercladding using an ASML deep UV scanner, and etched in an AMAT DPS polysilicon etch tool. Following the resist strip and standard post-etch and pre-diffusion cleans, a 300-nm LPCVD $Si_3N_4$ layer (i.e., conformal nitride) was deposited in an SVG series 6000 vertical furnace at about 800° C. A chemical-mechanical polish (CMP) was used to preferentially thin down the conformal nitride overlying the silicon cores. A hot phosphoric acid etch was used to clear the remaining nitride overlying the silicon waveguide.

Figure 8:
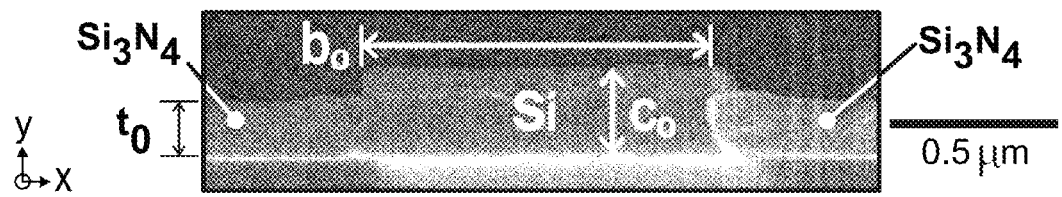
FIG. 8 is a cross-sectional view, based on an SEM image, of the waveguide core within the nitride membrane of an example PPER device.

FIG. 8 provides a view of the net result, based on a cross-sectional scanning electron microscope (SEM) image. Indicated in the figure are the width $b_0$ and thickness $c_0$ of the silicon optical waveguide and the thickness to of the nitride layer. The scale bar in the figure represents a distance of 0.5 μm.

The wafer was patterned again, and then the phononic crystal structure was formed by using an SF6-based RIE process in an Applied Materials eMxP+ chamber to etch the holes in the nitride layer. A concentrated 49% HF solution with surfactant was used to release the membrane by etching away the buried oxide layer. The phononic crystal membrane holes also serve as release ports to allow the HF solution access to the buried oxide layer.

FIG. 16 provides a view, based on a top-down SEM image, of a portion of the resulting structure. Indicated in the figure are the defect size $W_0$, defined as the center-to-center distance between the inclusions on either side of the silicon optical waveguide, the lattice constant $a_0$, and the hole radius $r_0$. The scale bar in the figure represents a distance of 5 μm.

Facets for fiber access were then obtained by patterning resist with a 1× mask in a SUSS MA-6 contact aligner and etching by a deep-RIE process.

The oxide under-cladding was then removed with a 49% HF etch.

The etch was timed to remove a vertical thickness of oxide extending down to the underlying silicon, so as to maximize the optical isolation of the waveguide from the substrate. Because an isotropic etch was used, a comparable amount of lateral etch also occurred during the release process. It is significant in this regard that HF etches buried oxide at a rate at least fifty times the rate at which it etches silicon nitride.

We observed significant thinning of the optical waveguide and of the membrane in the fabrication process described here.

Example 1: Prototype Phonon Emitter-Receiver

PPER platforms were fabricated as described above. In an example, the dimensions were:

$a_0 = 1$ μm
$b_0 = 950$ nm
$c_0 = 220$ nm
$r_0 = 0.385$ μm
$t_0 = 130$ nm
$W_0 = 5.7$ μm
$N = 6$
$N_c = 6$
Interaction length=7 mm.

A single-wavelength laser line at 1547 nm was intensity-modulated, using a Mach-Zehnder modulator, to synthesize pump waves $E_1^a(\omega_1)$ and $E_2^a(\omega_2)$ (equivalently, a pump wave and a local oscillator wave, as described above) for injection into Wg-A. The carrier-frequency component was suppressed by optimizing the bias voltage, so that only the two sidebands were injected into the waveguide.

Optical forces, generated through wave interference in Wg-A, drove phonon-mediated coherent information transduction in Wg-B through excitation of hybridized phonon supermodes. The phonon supermodes generated the new signal field $E_s^b(\omega_s)$ through travelling-wave phase modulation of the probe wave $E_3^b(\omega_3)$, which was injected into Wg-B at a wavelength of 1536 nm. The beat signal between the interfering pump waves was thus coherently transferred from Wg-A to Wg-B. The transduced signal was then measured at the output of Wg-B through heterodyne detection.

The frequency of the excited phonon was controlled by changing the RF modulation frequency $\Omega$. Sweeping the modulation frequency enabled quantitative study of the frequency response of the dual-channel PPER system from 1-9 GHz.

For the heterodyne four-wave mixing measurements, a portion of the 1536-nm probe beam was split off to provide a local oscillator and passed through an acousto-optic modulator with a frequency shift ($\Delta/2\pi$) of 40 MHz. It was then combined with the main (phonon-modulated) probe beam using a directional coupler. The beat note between local oscillator ($\omega_3+\Delta$) and the main probe beam ($\Omega_3\pm\Omega$) was analysed with an RF spectrum analyser. An estimated fiber-to-chip coupling loss of 15 dB and waveguide propagation loss of <1 dB cm$^{-1}$ were found through waveguide cutback measurements. The internal powers of the pump and probe beams were 7 mW and 6.3 mW, respectively.

Figure 17:
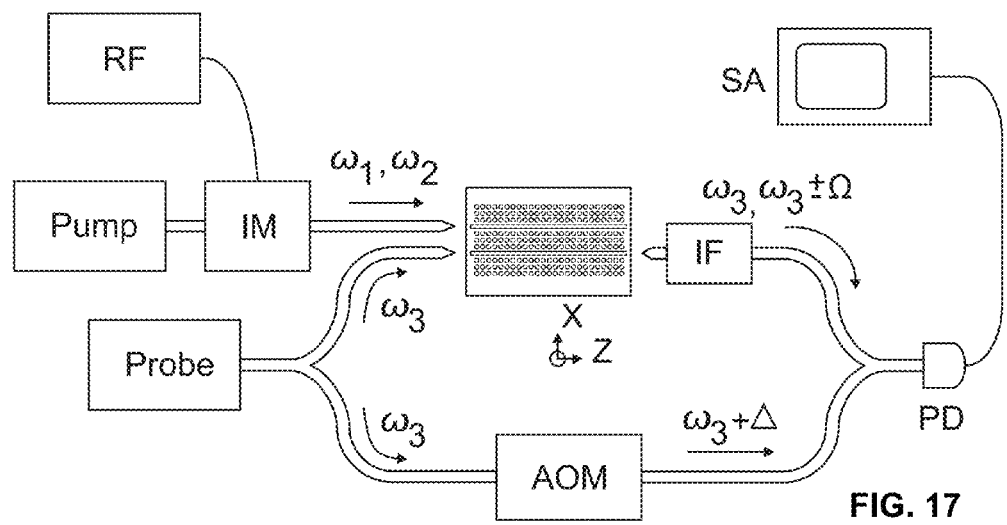
FIG. 17 is a schematic diagram of the apparatus used to measure the Brillouin nonlinearities of PnC-BAM waveguides in experiments that are reported here.

FIG. 17 is a schematic diagram of the apparatus used to measure the Brillouin nonlinearities of PnC-BAM waveguides in experiments that are reported here. The legends in the figure have the following meanings: Pump: 1,547 nm laser; Probe: 1,536 nm laser, IM: intensity modulator; RF: RF generator for the intensity modulator; AOM: acousto-optical modulator; IF: interference filter; PD: fast speed photodiode receivers; SA: spectrum analyser.

Figure 18:
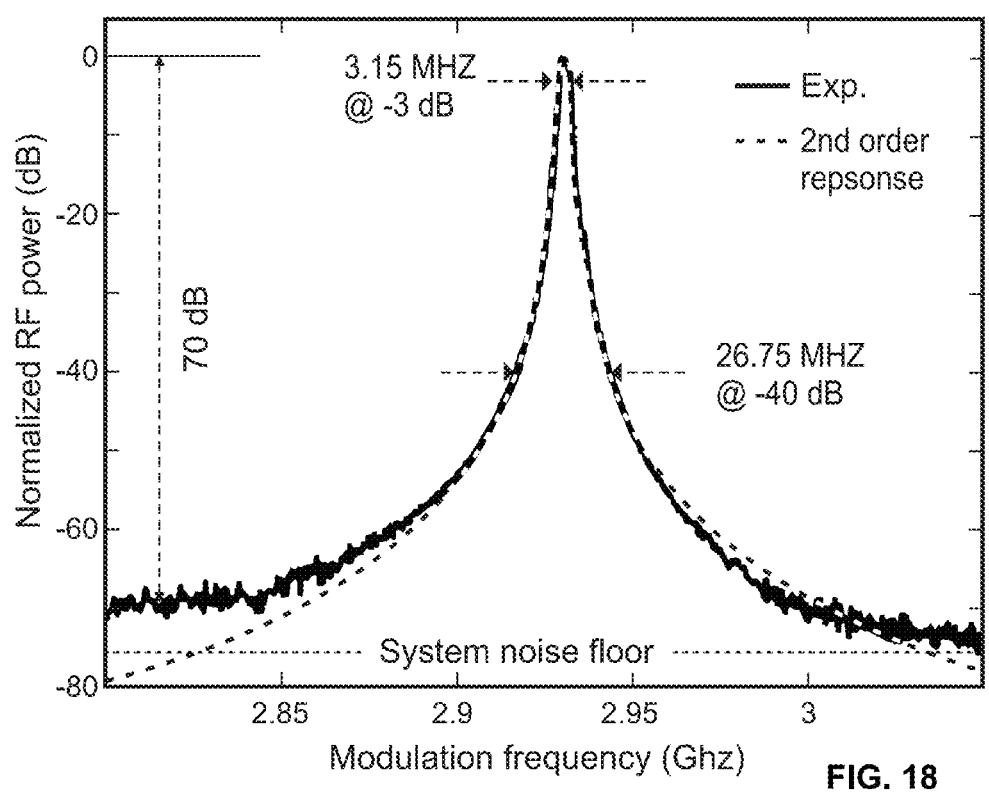
FIG. 18 is a comparative plot of the normalized RF response of a PPER system. The solid curve represents experimental data, and the broken curve is a theoretical prediction. The system noise floor is represented by a dotted line near the bottom of the figure.

FIG. 18 provides a plot of the normalized RF response of the example PPER system. The solid curve represents experimental measurements, and the broken curve represents the theoretical prediction based on a second-order transfer function. The system noise floor is also indicated in the figure.

It will be seen in the experimental plot of FIG. 18 that a sharp second-order frequency response is centered at 2.93 GHz, demonstrating efficient phonon-mediated information transfer between Wg-A and Wg-B. The measured data show a full width at half maximum of 3.15 MHz, corresponding to an aggregate Q-factor of about 930. The theoretical curve, from equation (1), above, is fit to the values $\mu$=8 MHz, $1/\tau_{net}$=6 MHz; its corresponding net Q factor, $Q_{net}=\Omega_o\tau_{net}/2\approx1530$, reveals remarkable structural homogeneity and low phonon dissipation over the entire device length.

With further reference to FIG. 18, it will be appreciated that the measured second-order response exhibits a very large out-of-band rejection of >70 dB; this implies that optical cross-talk will pose no limitation to the dynamic range of the measured frequency response. The contrast of the measurements is limited only by the measurement noise floor, which is indicated in the figure. We conclude that to a very high degree, information is transduced between Wg-A and Wg-B solely by the engineered phonon supermodes of the system.

Our measurements show that fiber-to-waveguide coupling efficiency limited the pump wave powers ($P_1^a, P_2^a\approx 3.5$ mW) in the device, yielding a peak signal-generation efficiency ($P_s^b/P_3^a$) of about $10^{-4}$. We believe that this net efficiency of information transfer can be significantly enhanced by increasing pump power ($P_s^b \propto P_1^a P_2^a$), interaction length ($P_s^b \propto L^2$), and Brillouin gain ($P_s^b \propto G_o^2$). For instance, with pump powers of $P_1^a=P_2^a\approx 70$ mW and longer interaction lengths ($P_s^b\approx 1.4$ cm), efficiencies of greater than 10% are readily achievable.

We also believe that significant enhancements in the photon-phonon coupling strength ($G_o$) can be realized by modifying the geometry of traveling-wave phonon emit-receive structures.

Example 2: Phononic Superdome Engineering

As explained above, the PPER response is determined solely by phonon supermodes straddling both waveguides. These supermodes are controllable by engineering the PnC structure. For example, the center frequencies of PPER supermodes can be tailored by engineering the defect size $W_o$.

Figure 19:
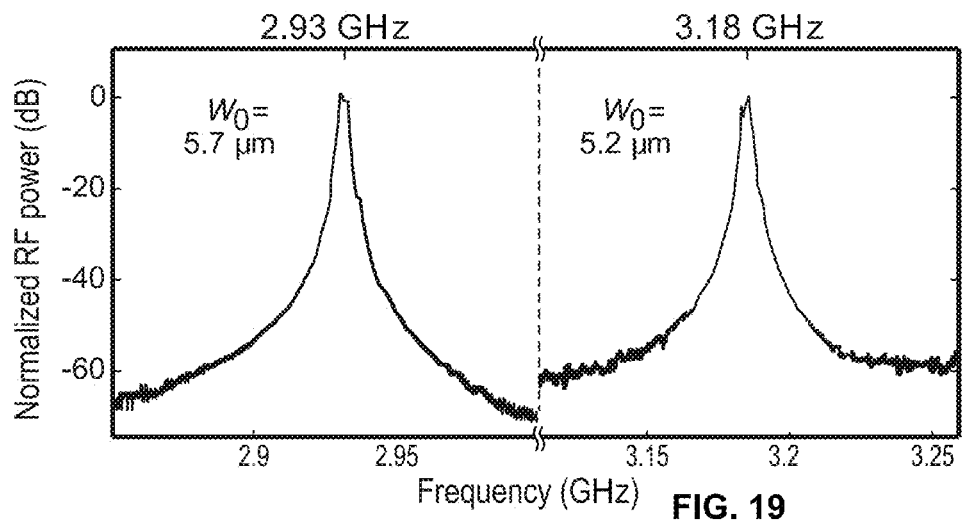
FIG. 19 provides side-by-side plots of the measured RF responses of PPER systems having two different values of the defect width $W_o$. In the left-hand plot, $W_o$=5.7 µm, and in the right-hand plot, $W_o$=5.2 µm.

FIG. 19 provides two plots of the measured and normalized RF response, i.e. the emit-receive response, of a PPER system as a function of frequency. The two plots compare the effect of changing the defect size $W_o$. In both plots, the PnC design had $N=N_c=6$. The left-hand plot had $W_o=5.7$ µm, and the right-hand plot had $W_o=5.2$ µm.

It will be seen that although the lineshape did not change significantly, the center frequency shifted by 250 MHz as the defect size was lithographically varied from 5.7 µm to 5.2 µm.

The PPER transfer function can also be shaped by lithographically controlling N, $N_c$ and $W_o$ to control the frequency splitting and decay rate of the PnC supermodes. To demonstrate this type of control, we examined the RF response of PPER systems with a fixed $W_o$ of 5.7 µm, while lithographically varying N and $N_c$.

Figure 20:
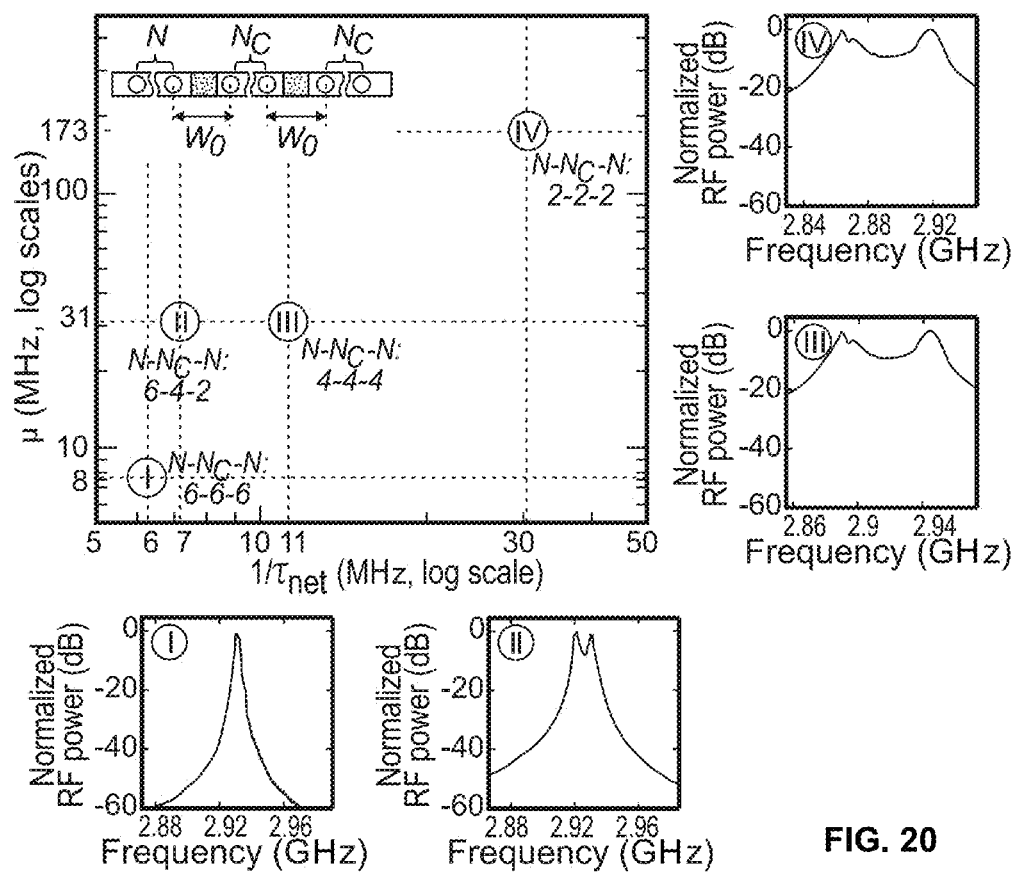
FIG. 20, in the main view, provides a plot of the coupling rate $\mu$ versus the reciprocal of the net decay rate $\tau_{net}^{-1}$ extracted from measured RF responses of four PPER systems having different design parameters. Results are shown in log-log scale. The inset in the top-left corner of the plot is the schematic geometry of the BAM waveguides. Insets I, II, III and IV in the right and bottom corners of the figure are the normalized RF power responses corresponding to the respective sets of design parameters.

FIG. 20, in the main view, provides a plot of the coupling rate $\mu$ versus the reciprocal of the net decay rate $\tau_{net}^{-1}$ extracted from measured RF responses of four PPER systems having different sets of design parameters, which are described below. Results are shown in log-log scale. The inset in the top-left corner of the plot is the schematic geometry of the BAM waveguides.

With further reference to FIG. 20, there will be seen, in insets i-IV, the experimentally measured and normalized RF responses of example PPER devices as a function of frequency. The design values {N, $N_c$, N} are varied among the insets as follows; Inset I: {6, 6, 6}; Inset II: {6, 4, 6}; Inset III: {4, 4, 4}; Inset IV: {2, 2, 2}.

From the data obtained on each design, we extracted the coupling rate ($\mu$) and the net decay rate ($1/\tau_{net}$) for each design by fitting the analytical response function of Equation (1), above, to the experimentally measured RF response. It will be appreciated on examination of the figure that the coupling rate and the net decay rate can be tailored over a significant range by varying the design parameters. It should be noted in this regard that the phononic coupling rate between Wg-A and Wg-B increases with smaller $N_c$ values, whereas the phonon lifetime drops with smaller N values.

This affords substantial control over the center frequency, bandwidth, shape-factor, and slope of the device RF response.

We have found that when applied as an RF filter, our PPER system can simultaneously demonstrate high dynamic range (70 dB), high Q-factor, wide rejection bandwidth (~1.9 GHz) and high selectivity (bandwidth of 3 MHz, low shape factor of 5 and a slope of more than 5 dB MHz$^{-1}$. The underlying phonon-mediated mechanism can form the basis for a host of powerful new coherent information processing technologies involving wavelength conversion, amplifier, RF mixing and RF photonic filter.

More generally, this compound emit-receive system behaves as a two-port (in the present example) optical system with negligible optical cross-talk and back-reflection: Information is transferred from one port to another through phononic information transduction. As this travelling-wave (or reflectionless) geometry negates the need for optical isolators, this platform is directly compatible with silicon-photonic systems.

Further, this hybrid photonic-phononic emit-receive approach yields filter shapes and frequency that do not change, even as the optical power is varied by orders of magnitude. This approach negates the need for frequency stabilization (or frequency locking), which often limits the practical utility of resonant optical filtering.

Embodiment with Optical Resonator

As explained above, our PPER system permits a great deal of flexibility in the choice of optical carrier wavelengths because it does not rely on optical resonance for its operation. However, when using low optical powers, phononic transduction using single-pass transmission of the optical waves through the waveguides might not be as efficient as desired. If some reduction in the available bandwidth for optical carriers can be tolerated, end-reflectors can be added to the optical waveguides so that the optical carriers are multiply reflected for greater efficiency.

In effect, adding the end reflectors converts the waveguides to Fabry-Perot cavities. The resonant mode structure that characterizes Fabry-Perot cavities will limit the RF signal bandwidth that can be modulated onto optical carriers. To relax this limitation, it is desirable to design the end-reflectors for a relatively low optical quality factor Q, not only to accommodate the modulation bandwidth, but typically also so that both the pump wave and the local oscillator wave can resonate within the cavity. On the other hand, the greater the Q, the greater the increase in built-up optical power, hence the greater the transduction efficiency. Hence there is a tradeoff between bandwidth and efficiency, in view of which different values of Q would be optimal for different applications. For example, relatively high values of Q would be desirable when the need to minimize optical power is dominant and only low-bandwidth RF signals need to be processed.

Suitable techniques for making resonant optical waveguides are well known in the art and need not be described here in detail. One waveguide design that is useful in this regard is a distributed Bragg reflector (DBR) waveguide having a periodic variation in the width of the waveguide. For engineering the center wavelength and bandwidth of the reflectors, and for minimizing radiative scattering at discontinuities, it will often be advantageous to vary the period of the DBR. Desirably, the period is made to vary adiabatically, according to well-known teachings in the art.

For example, having a waveguide with a short-period corrugation will allow light to propagate at a frequency below the photonic stopband. In two end-portions of the cavity, the period can be slowly increased so that the stopband is shifted downward to the optical frequency. This creates selective transmission and reflection, wherein the reflectivity and transmissivity are determined by the lengths of the long-period sections. Alternatively, a long-period corrugation can be designed to permit propagation at optical frequencies above the stopband, and the corrugations can have a shorter period in the mirror regions so as to shift the stopband upward.

Figure 21:
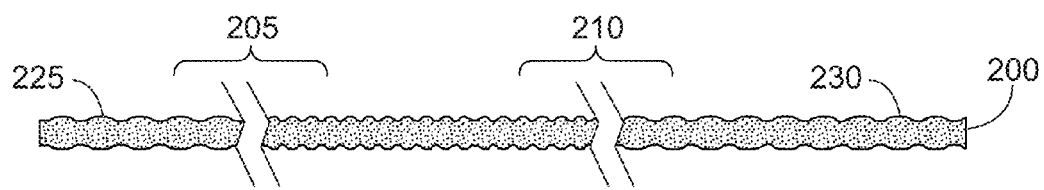
FIG. 21 is a plan view of an example design for an optical waveguide that has been conformed as a distributed Bragg reflector (DBR) cavity, which is useful for some of the embodiments described here.

Thus, by way of illustration, FIG. 21 shows a corrugated optical waveguide 200 in which there are gradual transitions 205, 210 (not shown explicitly) between short-period corrugation region 220 and long-period corrugation regions 225, 230. If, e.g., long-period region 225 is made relatively short, it can serve as a partially reflective optical coupling region. If long-period region 230 is made relatively long, it can serve as the strongly reflective end-stop region. Within the short-period region 225, light can resonate at frequencies below the photonic stopband.

For some applications, it may be desirable to add a Fabry-Perot cavity not only to the emitter waveguide, but also to the receiver waveguide to increase the efficiency of modulation onto the probe wave. Similar tradeoffs between bandwidth and efficiency will be encountered in the receiver waveguide.

Embodiment with Optical Mixing

Turning back to FIG. 3, it will be seen that modulation of the optical carrier at frequency $\omega_2$ has given rise to a pair of sidebands, shown in the figure as lying near the center frequency on its left and right sides. In the example provided there, the RF modulation frequency is less than the beat frequency $\omega_2-\omega_1$ that produces the phonons.

Figure 22:
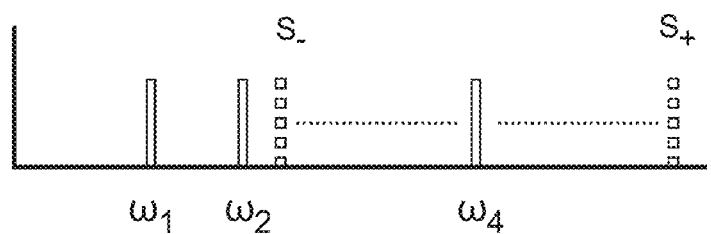
FIG. 22 is a notional optical frequency spectrum illustrating an optical mixing technique according to certain principles described here.

We now suppose that an additional optical carrier is injected into the emitter waveguide with a frequency $\omega_4$ that is relatively distant from the first two optical carriers. This is shown in FIG. 22.

We suppose further that, as shown in the figure, the optical carrier at $\omega_4$ is modulated at a high RF frequency that produces sidebands $S_-$, $S_+$ so far removed from the center frequency that the lower-frequency sideband S. reaches close proximity to $\omega_2$. As shown in the figure, the distance (in frequency) between $\omega_2$ and the sideband S. is smaller than the distance between $\omega_1$ and $\omega_2$.

Referring back to FIG. 5, it will be seen that an image of the sidebands imposed directly on carrier $\omega_2$ is transferred to the optical carrier at $\omega_3$ in the receiver waveguide. By the same mechanism, an image of sideband S. will be transferred to the optical carrier at $\omega_3$ in the receiver waveguide, as if it were a sideband of the carrier at $\omega_2$.

The kind of optical mixing described above has important consequences. As a practical matter, it is difficult to achieve the desired transfer functions with center frequencies above several tens of gigahertz, because of the difficulty of patterning the membrane at the fine scales that would be required. Hence directly processing RF signals at comparable frequencies is also precluded.

However, optical mixing provides a pathway for modulating an optical carrier at an RF frequency of tens, or even hundreds, of gigahertz, and then downshifting the modulation frequency and transducing phonons modulated at the downshifted frequency. The effective downshift occurs when, in the example given above, sideband S. interacts as though it were a sideband of the carrier at $\omega_1$. At the receiver waveguide, the process is reversed. This can be done so as to modulate the original RF signal onto the optical carrier in the receiver waveguide.

Embodiment with Single Waveguide

As explained above, the PnC structure can be engineered to impart desired characteristics to the transfer function for phononic coupling between waveguides. As also explained above, the phononic modal resonance associated with each optical waveguide depends on the width $W_0$ of the line defect within which the optical waveguide is placed. Even without reliance on waveguide-to-waveguide coupling through the PnC structure, the modal response of an individual line defect can be utilized for purposes such as RF filtering.

Accordingly, one useful application of the principles described above injects the emitter optical carrier waves into a waveguide, and also injects the receiver optical carrier wave into the same waveguide. An RF signal is modulated onto one of the emitter carrier waves. Phonons generated by the beat tone between the emitter carriers are confined within the line defect by the surrounding PnC structure. The generated phonons modulate the RF signal onto the receiver carrier.

RF filtering, for example, takes place because only the phonon frequencies $\Omega$ that satisfy the conditions for modal resonance in the line defect play a substantial role in the phononic transduction and hence in the modulation onto the receiver carrier wave.

Embodiment with Multistage Filter

In examples provided above, the emitter and receiver waveguides (and the line defects in which they are placed) are coupled through the PnC structure. The response function (viewing the device as a filter) is second order because of the hybridization of the two line defects to form two supermodes. Higher-order responses can be produced by adding more line defects to the PnC structure between the two waveguides. For example, a third-order filter can be created by adding a third line defect to the midline between the emitter and receiver waveguides.

Various modifications to the filter response can be achieved in that manner. For example, maintaining a constant defect width $W_0$ as line defects are added will steepen the slope of the filter response function. Varying the number of periods of the phononic crystals between the respective line defects will typically broaden the filter response. Varying the defect width of the line defects shifts the center frequency of the filter.

Figure 23:
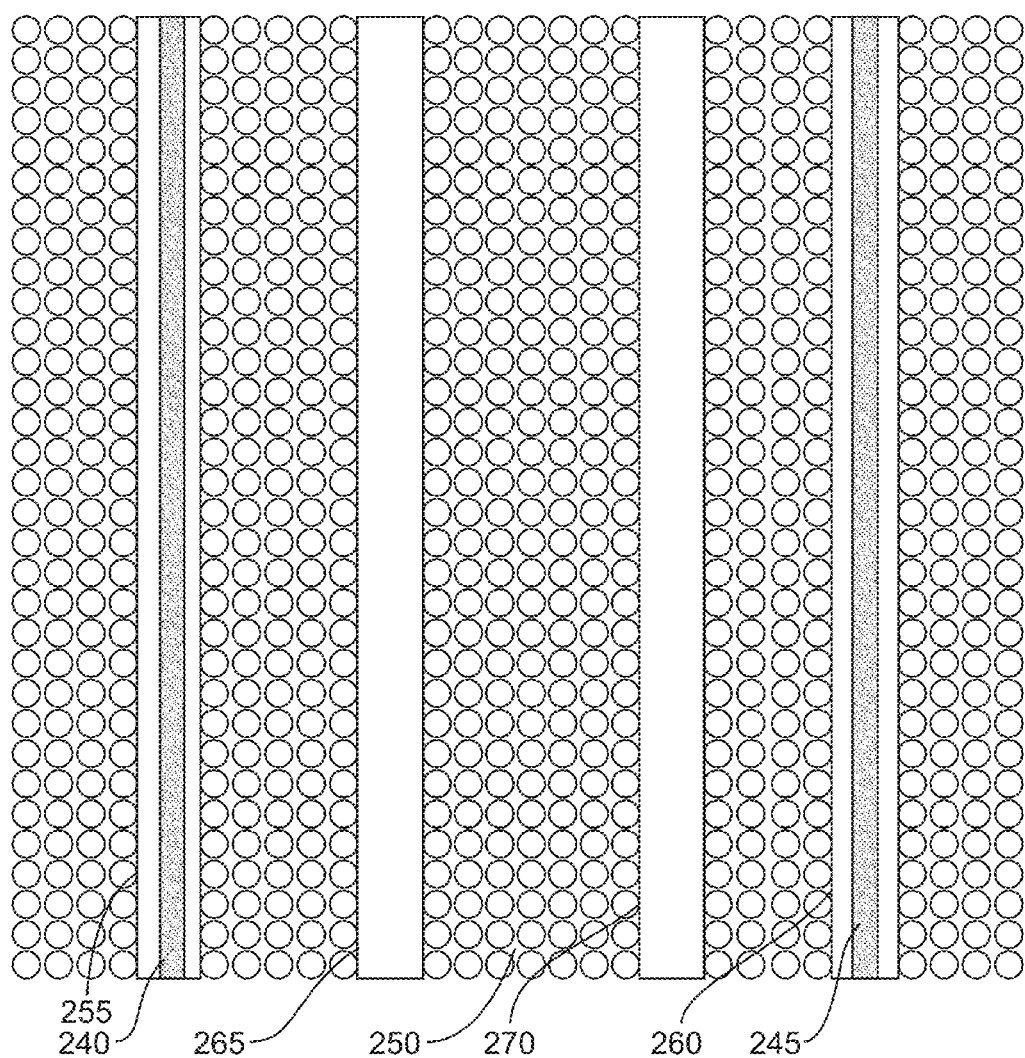
FIG. 23 is a schematic diagram providing an example of a multistage filter according to certain principles described here.

FIG. 23 is a schematic diagram providing an example of a multistage filter. As seen in the figure, emitter waveguide 240 and receiver waveguide 245 are embedded in PnC structure 250. Each waveguide is embedded in a respective line defect region 255, 260. A plurality (two, in this non-limiting example) of additional line defect regions 265, 270 is interposed between the emitter and receiver waveguides.

Time-Delay Element

It should be noted that aside from the filtering function, the various embodiments described here, using single waveguides or multiple waveguides, can also be used as optical delay devices. Indeed, because acoustic waves propagate at velocities roughly four orders of magnitude smaller than the velocity of light, it is possible to employ acoustic propagation paths shorter by the same factor than optical paths that achieve comparable delays. By way of example, phase delays can be achieved by coupling continuous-wave signals from the RF domain to the optical domain to the acoustic domain and back, and time delays can be achieved by similar coupling of pulsed signals.

The invention claimed is:

1. Apparatus comprising:
   a membrane in which a two-dimensionally periodic phononic crystal (PnC) structure is patterned; and
   at least a first optical waveguide embedded in the membrane;
   wherein at least a first line-defect region interrupts the PnC structure and the first optical waveguide is embedded within the line-defect region;
   wherein a photoelastically excitable vibrational mode of the line-defect region has a frequency that lies within a phononic bandgap of the PnC structure;
   and wherein the first optical waveguide embedded in the membrane comprises an optical cavity configured to receive an optical input carrier wave and an optical local oscillator wave.

2. The apparatus of claim 1, wherein the membrane is supported on a silicon-on-insulator (SOI) substrate.

3. The apparatus of claim 1, wherein the PnC structure is defined by a two-dimensional lattice of holes, and wherein the line-defect region lacks holes.

4. The apparatus of claim 1, wherein at least the first optical waveguide is a silicon waveguide.

5. The apparatus of claim 1, wherein the membrane is a silicon nitride membrane.

6. The apparatus of claim 1, wherein:
   at least a second optical waveguide is embedded in the membrane within a line-defect region that interrupts the PnC structure;
   the first and second optical waveguides are parallel to each other but have no substantial optical coupling to each other;
   a central region of the PnC structure lies between the first and second optical waveguides;
   the PnC structure is defined by a two-dimensional lattice of holes having a width of $N_C$ lattice periods between the first and second optical waveguides and a width of N lattice periods on the side of the first optical waveguide distal the second optical waveguide and on the side of the second optical waveguide distal the first optical waveguide;
   each line-defect region has a width W; and
   N, $N_C$, and W are selected to produce a symmetric phononic supermode and a corresponding antisymmetric phononic supermode of the line defect regions in which the respective first and second optical waveguides are embedded.

7. The apparatus of claim 6, wherein an input end of the first optical waveguide is optically coupled to a path for an optical input signal, and wherein an output end of the second optical waveguide is optically coupled to a path for an output signal.

8. The apparatus of claim 6, wherein:
   an input end of the first optical waveguide is optically coupled to a path for an optical input signal and an optical pump wave;
   an input end of the second optical waveguide is optically coupled to a path for an optical probe wave; and
   an output end of the second optical waveguide is optically coupled to a path for an output signal.

9. The apparatus of claim 6, wherein at least one further line-defect region interrupts the PnC structure between the first optical waveguide and the second optical waveguide.

10. The apparatus of claim 6, further comprising a signal source optically coupled to the first waveguide and a probe source optically coupled to the second waveguide.

11. The apparatus of claim 10, wherein said apparatus is configured as a frequency filter for radio-frequency (RF) signals modulated onto an optical input wave from the signal source.

12. The apparatus of claim 10, wherein said apparatus is configured as a wavelength converter for transferring radio-frequency (RF) signals from an optical carrier signal of a first carrier wavelength propagating in the first optical waveguide to an optical carrier of a second carrier wavelength propagating in the second optical waveguide.

13. The apparatus of claim 10, wherein said apparatus is configured as an amplifier for transferring radio-frequency (RF) signals from an optical carrier signal of a first intensity propagating in the first optical waveguide to an optical carrier of a second intensity propagating in the second optical waveguide.

14. The apparatus of claim 10, wherein said apparatus is configured as a time-delay element.

15. The apparatus of claim 10, adapted to couple an optical carrier wave and an optical local oscillator wave into the first waveguide, wherein the apparatus further comprises a radio-frequency (RF) modulator arranged to modulate an RF signal onto the optical carrier wave.

16. The apparatus of claim 1, wherein the optical cavity is a Fabry-Perot resonator cavity.

17. The apparatus of claim 1, wherein the optical cavity is a distributed Bragg reflector cavity.

18. The apparatus of claim 17, wherein the distributed Bragg reflector cavity is defined by width variations in the first optical waveguide.

19. A method for processing an input radio-frequency (RF) signal to produce an output RF signal, comprising:
    modulating the input RF signal onto an optical input carrier wave;
    injecting the optical input carrier wave into a first optical waveguide embedded in a membrane in which a two-dimensionally periodic phononic crystal (PnC) structure is patterned, wherein the optical waveguide is embedded within a line-defect region of the PnC structure and comprises an optical cavity;
    injecting a local oscillator wave having a local oscillator frequency into the first optical waveguide concurrently with the optical input carrier wave so as to create a beat tone between said carrier and local oscillator waves, whereby phonons are launched into the membrane, wherein the launched phonons correspond to a photoelastically excitable vibrational mode of the line-defect region and have a frequency that lies within a phononic bandgap of the PnC structure;
    tuning a center frequency of the launched phonons by varying the local oscillator frequency;
    injecting an optical probe wave into the first optical waveguide embedded in the membrane, or into a further optical waveguide embedded in the membrane, within a range of the launched phonons, whereby the optical probe wave is modulated by the launched phonons;
    extracting the phonon-modulated optical probe wave from its optical waveguide; and
    demodulating extracted phonon-modulated optical probe wave, thereby to obtain the output RF signal.

20. The method of claim 19, wherein the optical input carrier wave, the local oscillator wave, and the optical probe wave are all injected into the same waveguide.

21. The method of claim 19, wherein:
    the optical input carrier wave and the local oscillator wave are injected into a first optical waveguide;
    at least a second optical waveguide is embedded in the membrane within a line-defect region that interrupts the PnC structure;
    the first and second optical waveguides are parallel to each other but have no substantial optical coupling to each other;
    a central region of the PnC structure lies between the first and second optical waveguides; and
    the optical probe wave is injected into the second optical waveguide.

22. The method of claim 21 carried out to perform a filtering operation, wherein the filtering comprises propagating the launched phonons through at least one further line-defect region that lies between the first and second waveguides.

23. The method of claim 19, wherein:
    a first optical carrier wave and a second optical carrier wave are concurrently injected into the first optical waveguide;
    the first optical carrier wave is spaced near enough in frequency to the local oscillator wave to create a beat tone able to launch phonons into the membrane;
    the local oscillator wave is closer in frequency to the first optical carrier wave than to the second optical carrier wave;
    the input RF signal is modulated onto the second optical carrier wave; and
    the modulation of the input RF signal onto the second optical carrier wave produces at least one sideband that is separated from the first optical carrier wave by a frequency separation that is less than the frequency separation between the first optical carrier wave and the optical probe wave.

* * * * *